United States Patent
Hood et al.

(10) Patent No.: US 9,557,900 B2
(45) Date of Patent: Jan. 31, 2017

(54) AUTOMATIC USER INTERFACE GENERATION

(71) Applicant: Rockwell Automation Technologies, Inc., Mayfield Heights, OH (US)

(72) Inventors: Gavan W. Hood, Upper Lockyer (AU); Ralph Kappelhoff, Milwaukee, WI (US); Kenwood H. Hall, Hudson, OH (US)

(73) Assignee: ROCKWELL AUTOMATION TECHNOLOGIES, INC., Mayfield Heights, OH (US)

(*) Notice: Subject to any disclaimer, the term of this patent is extended or adjusted under 35 U.S.C. 154(b) by 385 days.

(21) Appl. No.: 14/249,728

(22) Filed: Apr. 10, 2014

(65) Prior Publication Data

US 2014/0223342 A1   Aug. 7, 2014

Related U.S. Application Data

(63) Continuation of application No. 11/238,607, filed on Sep. 29, 2005, now Pat. No. 8,799,800.

(60) Provisional application No. 60/680,682, filed on May 13, 2005.

(51) Int. Cl.
   G06F 3/0484   (2013.01)
   G06F 9/44     (2006.01)

(52) U.S. Cl.
   CPC .............. G06F 3/0484 (2013.01); G06F 8/35 (2013.01); G06F 9/4443 (2013.01)

(58) Field of Classification Search
   CPC ......... G06F 3/0484; G06F 9/4443; G06F 8/35
   See application file for complete search history.

(56) References Cited

U.S. PATENT DOCUMENTS

| | | |
|---|---|---|
| 4,268,901 A | 5/1981 | Subrizi et al. |
| 4,347,564 A | 8/1982 | Sugano et al. |
| 4,623,964 A | 11/1986 | Getz et al. |
| 5,072,374 A | 12/1991 | Sexton et al. |
| 5,185,708 A | 2/1993 | Hall et al. |
| 5,253,184 A | 10/1993 | Kleinschnitz |
| 5,282,244 A | 1/1994 | Fuller et al. |
| 5,301,320 A | 4/1994 | McAtee et al. |
| 5,446,868 A | 8/1995 | Gardea et al. |
| 5,455,775 A | 10/1995 | Huber et al. |
| 5,485,620 A | 1/1996 | Sadre et al. |
| 5,504,891 A | 4/1996 | Motoyama et al. |
| 5,537,585 A | 7/1996 | Blickenstaff et al. |
| 5,572,731 A | 11/1996 | Morel et al. |

(Continued)

OTHER PUBLICATIONS

Office Action dated Nov. 16, 2009 for U.S. Appl. No. 11/238,607, 84 pages.

(Continued)

*Primary Examiner* — Sara England

(74) *Attorney, Agent, or Firm* — Amin, Turocy & Watson, LLP

(57) ABSTRACT

A user interface generation system comprises a reception component that facilitates receipt of instantiated objects from within a programmable logic controller, wherein the objects conform to a hierarchically structured data model. A view generation component communicatively coupled to the reception component utilizes a subset of the objects to dynamically generate a user interface. For example, the hierarchically structured data model can be based at least in part upon one or more of ISA S95, ISA S88 and/or OMA.

20 Claims, 12 Drawing Sheets

(56) References Cited

U.S. PATENT DOCUMENTS

| | | |
|---|---|---|
| 5,611,059 A | 3/1997 | Benton et al. |
| 5,619,724 A | 4/1997 | Moore |
| 5,634,048 A | 5/1997 | Ryu et al. |
| 5,644,740 A | 7/1997 | Kiuchi |
| 5,675,748 A | 10/1997 | Ross |
| 5,715,413 A | 2/1998 | Ishai et al. |
| 5,721,905 A | 2/1998 | Elixmann et al. |
| 5,761,499 A | 6/1998 | Sonderegger |
| 5,790,935 A | 8/1998 | Payton |
| 5,797,137 A | 8/1998 | Golshani et al. |
| 5,812,773 A | 9/1998 | Norin |
| 5,828,851 A | 10/1998 | Nixon et al. |
| 5,832,486 A | 11/1998 | Itoh et al. |
| 5,838,563 A | 11/1998 | Dove et al. |
| 5,848,273 A | 12/1998 | Fontana et al. |
| 5,862,052 A | 1/1999 | Nixon et al. |
| 5,884,025 A | 3/1999 | Baehr et al. |
| 5,884,033 A | 3/1999 | Duvall et al. |
| 5,913,029 A | 6/1999 | Shostak |
| 5,924,094 A | 7/1999 | Sutter |
| 5,936,539 A | 8/1999 | Fuchs |
| 5,940,294 A | 8/1999 | Dove |
| 5,940,854 A | 8/1999 | Green, Jr. et al. |
| 5,951,440 A | 9/1999 | Reichlinger |
| 5,960,420 A | 9/1999 | Leymann et al. |
| 5,966,705 A | 10/1999 | Koneru |
| 5,970,494 A | 10/1999 | Velissaropoulos et al. |
| 5,978,577 A | 11/1999 | Rierden et al. |
| 5,980,078 A | 11/1999 | Krivoshein et al. |
| 5,983,016 A | 11/1999 | Brodsky et al. |
| 5,997,167 A | 12/1999 | Crater et al. |
| 6,011,899 A | 1/2000 | Ohishi et al. |
| 6,032,208 A | 2/2000 | Nixon et al. |
| 6,044,217 A | 3/2000 | Brealey et al. |
| 6,061,740 A | 5/2000 | Ferguson et al. |
| 6,063,129 A | 5/2000 | Dadd et al. |
| 6,081,899 A | 6/2000 | Byrd |
| 6,098,116 A | 8/2000 | Nixon et al. |
| 6,101,531 A | 8/2000 | Eggleston et al. |
| 6,157,864 A | 12/2000 | Schwenke et al. |
| 6,195,591 B1 | 2/2001 | Nixon et al. |
| 6,208,987 B1 | 3/2001 | Nihei |
| 6,234,899 B1 | 5/2001 | Nulph |
| 6,266,726 B1 | 7/2001 | Nixon et al. |
| 6,268,853 B1 | 7/2001 | Hoskins et al. |
| 6,275,977 B1 | 8/2001 | Nagai et al. |
| 6,308,168 B1 | 10/2001 | Dovich et al. |
| 6,308,224 B1 | 10/2001 | Leymann et al. |
| 6,311,187 B1 | 10/2001 | Jeyaraman |
| 6,327,511 B1 | 12/2001 | Naismith et al. |
| 6,336,152 B1 | 1/2002 | Richman et al. |
| 6,356,920 B1 | 3/2002 | Vandersluis |
| 6,377,957 B1 | 4/2002 | Jeyaraman |
| 6,393,566 B1 | 5/2002 | Levine |
| 6,398,106 B1 | 6/2002 | Ulvr et al. |
| 6,409,082 B1 | 6/2002 | Davis et al. |
| 6,411,987 B1 | 6/2002 | Steger et al. |
| 6,415,983 B1 | 7/2002 | Ulvr et al. |
| 6,425,051 B1 | 7/2002 | Burton et al. |
| 6,438,744 B2 | 8/2002 | Toutonghi et al. |
| 6,445,963 B1 | 9/2002 | Blevins et al. |
| 6,446,202 B1 | 9/2002 | Krivoshein et al. |
| 6,457,053 B1 | 9/2002 | Satagopan et al. |
| 6,469,986 B1 | 10/2002 | Lecheler et al. |
| 6,473,656 B1 | 10/2002 | Langels et al. |
| 6,477,435 B1 | 11/2002 | Ryan et al. |
| 6,484,061 B2 | 11/2002 | Papadopoulos et al. |
| 6,501,996 B1 | 12/2002 | Bieber |
| 6,505,247 B1 | 1/2003 | Steger et al. |
| 6,510,352 B1 | 1/2003 | Badavas et al. |
| 6,539,271 B2 | 3/2003 | Lech et al. |
| 6,539,430 B1 | 3/2003 | Humes |
| 6,539,458 B2 | 3/2003 | Holmberg |
| 6,615,091 B1 | 9/2003 | Birchenough et al. |
| 6,631,519 B1 | 10/2003 | Nicholson et al. |
| 6,643,555 B1 | 11/2003 | Eller et al. |
| 6,661,426 B1 | 12/2003 | Jetha et al. |
| 6,664,981 B2 | 12/2003 | Ashe et al. |
| 6,676,309 B2 | 1/2004 | Shima |
| 6,681,227 B1 | 1/2004 | Kojima et al. |
| 6,687,817 B1 | 2/2004 | Paul |
| 6,697,797 B1 | 2/2004 | Hoggatt et al. |
| 6,704,746 B2 | 3/2004 | Sokolov et al. |
| 6,714,949 B1 | 3/2004 | Frey, Jr. |
| 6,714,981 B1 | 3/2004 | Skaggs |
| 6,738,821 B1 | 5/2004 | Wilson et al. |
| 6,745,089 B2 | 6/2004 | Rasmussen et al. |
| 6,748,486 B2 | 6/2004 | Burton et al. |
| 6,751,634 B1 | 6/2004 | Judd |
| 6,758,403 B1 | 7/2004 | Keys et al. |
| 6,760,721 B1 | 7/2004 | Chasen et al. |
| 6,760,732 B2 | 7/2004 | Busshart et al. |
| 6,763,395 B1 | 7/2004 | Austin |
| 6,766,312 B2 | 7/2004 | Landt |
| 6,768,987 B1 | 7/2004 | Couch et al. |
| 6,769,095 B1 | 7/2004 | Brassard et al. |
| 6,778,537 B1 | 8/2004 | Ishibashi |
| 6,801,822 B1 | 10/2004 | Fujiwara et al. |
| 6,807,632 B1 | 10/2004 | Carpentier et al. |
| 6,809,732 B2 | 10/2004 | Zatz et al. |
| 6,832,120 B1 | 12/2004 | Frank et al. |
| 6,836,892 B2 | 12/2004 | Ikoma et al. |
| 6,839,790 B2 | 1/2005 | Barros De Almeida et al. |
| 6,842,769 B1 | 1/2005 | Kim et al. |
| 6,853,920 B2 | 2/2005 | Hsiung et al. |
| 6,865,509 B1 | 3/2005 | Hsiung et al. |
| 6,868,413 B1 | 3/2005 | Grindrod et al. |
| 6,874,145 B1 | 3/2005 | Ye et al. |
| 6,874,146 B1 | 3/2005 | Iyengar |
| 6,880,060 B2 | 4/2005 | Talagala et al. |
| 6,889,282 B2 | 5/2005 | Schollenberger |
| 6,901,578 B1 | 5/2005 | Beaven et al. |
| 6,904,450 B1 | 6/2005 | King et al. |
| 6,904,473 B1 | 6/2005 | Bloxham et al. |
| 6,920,474 B2 | 7/2005 | Walsh et al. |
| 6,928,521 B1 | 8/2005 | Burton et al. |
| 6,930,985 B1 | 8/2005 | Rathi et al. |
| 6,934,749 B1 | 8/2005 | Black et al. |
| 6,938,079 B1 | 8/2005 | Anderson et al. |
| 6,944,626 B2 | 9/2005 | Cameron et al. |
| 6,947,947 B2 | 9/2005 | Block et al. |
| 6,950,900 B1 | 9/2005 | McKean et al. |
| 6,954,770 B1 | 10/2005 | Carlson et al. |
| 6,961,728 B2 | 11/2005 | Wynblatt et al. |
| 6,973,556 B2 | 12/2005 | Milligan et al. |
| 6,975,913 B2 | 12/2005 | Kreidler et al. |
| 6,985,902 B2 | 1/2006 | Wise et al. |
| 7,000,017 B2 | 2/2006 | McGill et al. |
| 7,031,782 B2 | 4/2006 | Kappelhoff et al. |
| 7,065,714 B1 | 6/2006 | Theel et al. |
| 7,146,355 B2 | 12/2006 | Chu-Carroll |
| 7,162,312 B2 | 1/2007 | Gross et al. |
| 7,171,476 B2 | 1/2007 | Maeda et al. |
| 7,225,193 B2 | 5/2007 | Mets et al. |
| 7,251,193 B2 | 7/2007 | Jung |
| 7,251,222 B2 | 7/2007 | Chen et al. |
| 7,308,454 B2 | 12/2007 | Abineri et al. |
| 8,291,309 B2 | 10/2012 | Callaghan et al. |
| 2002/0007286 A1 | 1/2002 | Okamoto |
| 2002/0012401 A1 | 1/2002 | Karolys et al. |
| 2002/0013748 A1 | 1/2002 | Edmison et al. |
| 2002/0069167 A1 | 6/2002 | Conlow |
| 2002/0073236 A1 | 6/2002 | Helgeson et al. |
| 2002/0087786 A1 | 7/2002 | Burton et al. |
| 2002/0091838 A1 | 7/2002 | Rupp et al. |
| 2002/0103785 A1 | 8/2002 | Harvey |
| 2002/0131404 A1 | 9/2002 | Mehta et al. |
| 2002/0161827 A1 | 10/2002 | Brault |
| 2002/0188366 A1 | 12/2002 | Pepper et al. |
| 2002/0194577 A1 | 12/2002 | Connor et al. |
| 2003/0014387 A1 | 1/2003 | Kreidler et al. |
| 2003/0036876 A1 | 2/2003 | Fuller et al. |
| 2003/0065673 A1 | 4/2003 | Grobler et al. |
| 2003/0090514 A1 | 5/2003 | Cole et al. |

(56) References Cited

U.S. PATENT DOCUMENTS

| | | |
|---|---|---|
| 2003/0120710 A1 | 6/2003 | Pulsipher et al. |
| 2003/0123467 A1 | 7/2003 | Du et al. |
| 2003/0126308 A1 | 7/2003 | Kim |
| 2003/0172145 A1 | 9/2003 | Nguyen |
| 2003/0177114 A1 | 9/2003 | Lin et al. |
| 2003/0184584 A1 | 10/2003 | Vachuska et al. |
| 2003/0212828 A1 | 11/2003 | Miyazaki et al. |
| 2003/0218641 A1 | 11/2003 | Longobardi |
| 2003/0233427 A1 | 12/2003 | Taguchi |
| 2004/0006401 A1 | 1/2004 | Yamada et al. |
| 2004/0024995 A1 | 2/2004 | Swaine |
| 2004/0044421 A1 | 3/2004 | Brune et al. |
| 2004/0073565 A1 | 4/2004 | Kaufman et al. |
| 2004/0098153 A1 | 5/2004 | Neudeck |
| 2004/0098269 A1 | 5/2004 | Wise et al. |
| 2004/0117624 A1 | 6/2004 | Brandt et al. |
| 2004/0153171 A1 | 8/2004 | Brandt et al. |
| 2004/0167790 A1 | 8/2004 | Grasse |
| 2004/0193449 A1 | 9/2004 | Wildman et al. |
| 2004/0196855 A1 | 10/2004 | Davies et al. |
| 2004/0199655 A1 | 10/2004 | Davies et al. |
| 2004/0203620 A1 | 10/2004 | Thome et al. |
| 2004/0210629 A1 | 10/2004 | Klindt et al. |
| 2004/0249771 A1 | 12/2004 | Berg et al. |
| 2004/0260591 A1 | 12/2004 | King |
| 2004/0268186 A1 | 12/2004 | Maturana et al. |
| 2005/0005289 A1 | 1/2005 | Adolph et al. |
| 2005/0015397 A1 | 1/2005 | Abineri et al. |
| 2005/0043922 A1 | 2/2005 | Weidl et al. |
| 2005/0044112 A1 | 2/2005 | Yamamoto et al. |
| 2005/0065626 A1 | 3/2005 | Kappelhoff et al. |
| 2005/0065829 A1 | 3/2005 | Birkhoelzer |
| 2005/0065971 A1 | 3/2005 | Honda |
| 2005/0069853 A1 | 3/2005 | Tyson et al. |
| 2005/0091349 A1 | 4/2005 | Scheibli |
| 2005/0102672 A1 | 5/2005 | Brothers |
| 2005/0107897 A1 | 5/2005 | Callaghan |
| 2005/0108247 A1 | 5/2005 | Heinla et al. |
| 2005/0120021 A1 | 6/2005 | Tang et al. |
| 2005/0129247 A1 | 6/2005 | Gammel et al. |
| 2005/0135782 A1 | 6/2005 | Ando et al. |
| 2005/0154741 A1 | 7/2005 | Hebert et al. |
| 2005/0166215 A1 | 7/2005 | Holloway et al. |
| 2005/0177687 A1 | 8/2005 | Rao |
| 2005/0187925 A1 | 8/2005 | Schechinger et al. |
| 2005/0193118 A1 | 9/2005 | Le et al. |
| 2005/0198248 A1 | 9/2005 | Morimoto et al. |
| 2005/0216460 A1 | 9/2005 | Yoon et al. |
| 2005/0223010 A1 | 10/2005 | Murray |
| 2005/0251527 A1 | 11/2005 | Phillips et al. |
| 2005/0256788 A1 | 11/2005 | Mukai |
| 2005/0268253 A1 | 12/2005 | Johnson et al. |
| 2005/0278373 A1 | 12/2005 | Corbett et al. |
| 2006/0004475 A1 | 1/2006 | Brackett et al. |
| 2006/0004847 A1 | 1/2006 | Claudatos et al. |
| 2006/0064428 A1 | 3/2006 | Colaco et al. |
| 2006/0173895 A1 | 8/2006 | Engquist et al. |
| 2006/0195817 A1 | 8/2006 | Moon |
| 2006/0212855 A1 | 9/2006 | Bournas et al. |
| 2007/0268922 A1 | 11/2007 | Dougan et al. |

OTHER PUBLICATIONS

Office Action dated Oct. 28, 2008 for U.S. Appl. No. 11/240,335, 15 pages.
Office Action dated Apr. 15, 2009 for U.S. Appl. No. 11/240,335, 10 pages.
Office Action dated May 15, 2008 for U.S. Appl. No. 11/240,335, 31 pages.
Office Action dated Oct. 8, 2008 for U.S. Appl. No. 11/238,607, 32 pages.
ISR mailed Jul. 7, 2008 for PCT Application No. PCT/US06/18180, 2 pages.
Office Action dated Mar. 6, 2009 for U.S. Appl. No. 11/238,607, 61 pages.
Office Action dated Apr. 2, 2008 for U.S. Appl. No. 11/238,607, 37 pages.
Office Action dated Jun. 3, 2009 for U.S. Appl. No. 11/238,606, 25 pages
Office Action dated Jul. 2, 2008 for U.S. Appl. No. 11/238,606, 17 pages.
Office Action dated Jan. 18, 2008 for U.S. Appl. No. 11/238,606, 8 pages.
Office Action dated Nov. 20, 2008 for U.S. Appl. No. 11/238,606, 19 pages.
Office Action dated Apr. 22, 2008 for U.S. Appl. No. 11/238,537, 48 pages.
Office Action dated Apr. 15, 2009 for U.S. Appl. No. 11/238,537, 22 pages.
Ozsoyoglu, et al. Database Systems for Programmable Logic Contollers. Last accessed Apr. 15, 2009, 17 pages.
Office Action dated Oct. 20, 2008 for U.S. Appl. No. 11/238,537, 44 pages.
Office Action dated May 1, 2009 for U.S. Appl. No. 11/239,567, 35 pages.
Office Action dated May 30, 2008 for U.S. Appl. No. 11/239,567, 29 pages.
Pitzek et al., Configuration and Management of a Real-Time Smart Transducer Network, 2003 IEEE, 2003, 4 pages.
European Search Report dated Jun. 12, 2005 for European Patent Application Serial No. EP05016793, 3 pages.
John Kubiatowicz, et al. "OceanStore: An Architecture for Global-Scale Persistent Storage" ASPLOS 2000, Cambridge, Massachusetts (2000).
Roy Goldman, et al. "From Semistructured Data to XML: Migrating the Lore Data Model and Query Language" (1999).
SOFA/DCUP: Architecture for Component Trading and Dynamic Updating, by Plasil et al., Proceedings of the International Conference on Configurable Distributed Systems, p. 43, 1998, ISBN:O-8186-8451-8.
Office Action dated Oct. 9, 2009 for U.S. Appl. No. 11/239,567, 41 pages.
Office Action dated Nov. 14, 2008 for U.S. Appl. No. 11/239,567, 34 pages.
Office Action dated Nov. 2, 2007 for U.S. Appl. No. 11/239,567, 23 pages.
Office Action dated Jul. 15, 2013 for U.S. Appl. No. 11/238,607, 21 pages.
Notice of Allowance dated Jan. 2, 2014 for U.S. Appl. No. 11/238,607, 15 pages.

AUTOMATIC USER INTERFACE GENERATION

CROSS-REFERENCE TO RELATED APPLICATION

This application is a continuation of U.S. patent application Ser. No. 11/238,607, filed on Sep. 29, 2005 and entitled "AUTOMATIC USER INTERFACE GENERATION," which claims the benefit of U.S. Provisional Patent Application Ser. No. 60/680,682, filed on May 13, 2005 and entitled "SCHEMA THAT FACILITATES PLANT REPRESENTATION AND RELATED FUNCTIONALITY," the entireties of which are incorporated herein by reference.

TECHNICAL FIELD

The claimed subject matter relates to industrial control systems and, more particularly, to automatically generating user interfaces based upon data within a programmable logic controller.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases or web services referencing databases that are accessible by system/process/project managers on a factory floor. For instance, sensors and associated software can detect a number of instances that a particular machine has completed an operation given a defined amount of time. Further, data from sensors can be delivered to a processing unit relating to system alarms. Thus, a factory automation system can review collected data and automatically and/or semi-automatically schedule maintenance of a device, replacement of a device, and other various procedures that relate to automating a process.

While various advancements have been made with respect to automating an industrial process, utilization and design of controllers has been largely unchanged. Industrial controllers are special-purpose computers utilized for controlling industrial processes, manufacturing equipment, and other factory automation processes, such as data collection through networked systems. Controllers often work in concert with other computer systems to form an environment whereby a majority of modern and automated manufacturing operations occur. These operations involve front-end processing of materials such as steel production to more intricate manufacturing processes such as automobile production that involves assembly of previously processed materials. Often such as in the case of automobiles, complex assemblies can be manufactured with high technology robotics assisting the industrial control process.

In many automated processes, including the basic production of commodities such as food, beverages, and pharmaceuticals, complex state logic is often designed and programmed by systems Engineers or provided in some cases by automated equipment manufacturers. This logic is often programmed with common PLC ladder logic or higher level languages supported by Sequential Function Charts or Function Blocks. Sequence logic can be employed for a plurality of tasks such as material movement and conveying operations, packaging operations, or as part of an assembly process itself, wherein various stages of an assembly are sequenced from stage to stage until a final assembly occurs. As can be appreciated, much planning and design is required to implement an automated production process that can involve hundreds of machines, computers, and program logic to facilitate proper operation of the respective sequences.

A common problem associated with control systems is lack of uniformity across system/process boundaries, as well as a lack of uniformity between controller manufacturers, software vendors, and customers. Such non-uniformity can be as simplistic as discrepancies in naming conventions between a software vendor and a customer, or as complex as disparate software representations with respect to portions of an industrial automation framework. Given the above-mentioned discrepancies (as well as a myriad of other discrepancies), a substantial amount of ad-hoc coding is often required to automate a process. Accordingly, a substantial amount of cost is incurred by a manufacturer to employ computer and programming specialists to generate and maintain ad-hoc programs necessary to automate a manufacturing process. This cost is then passed on to purchasers of the manufactured product.

With more detail regarding conventional controllers, such controllers have been designed to efficiently undertake real-time control. For instance, conventional programmable logic controllers receive data from sensors and, based upon the received data, control an actuator, drive, or the like. These controllers recognize a source and/or destination of the data by way of a symbol and/or address associated with a source and/or destination. More particularly, industrial controllers include communications ports and/or adaptors, and sensors, actuators, drives, and the like are communicatively coupled to such ports/adaptors. Thus, a controller can recognize device identify when data is received and further deliver control data to an appropriate device.

As can be discerned from the above, data associated with conventional industrial controllers is created, delivered, and/or stored with a flat namespace data structure. In other words, all that can be discovered by reviewing data received and/or output by a controller is an identity of an actuator or sensor and a status thereof. This industrial controller architecture operates efficiently for real-time control of a particular device—however, problems can arise when data from industrial controllers is desired for use by a higher-level system. For example, if data from the controller was desired for use by a scheduling application, individual(s) familiar with the controller must determine which data is desirable, sort the data, package the data in a desired format, and thereafter map such data to the scheduling application. This introduces another layer of software, and thus provides opportunities for confusion in an industrial automation environment. The problem is compounded if several applications wish to utilize similar data. In operation, various controllers output data, package it in a flat namespace structure, and provide it to a network. Each application utilizing the data copies such data to internal memory, sorts the data, organizes the data, and packages the data in a desired format. Accordingly, multiple copies of similar data exist in a plurality of locations, where each copy of the data may be organized and packaged disparately.

It can be determined from the above that provision of user interfaces to operators is problematic in today's industrial automation environments. Conventionally, view frameworks are built and then populated with data received from a controller. Thus, user interfaces are pre-defined and then populated based upon data received from a programmable logic controller. In many instances, however, this one-size fits-all view is insufficient and does not provide adequate detail to an operator. For example, if data lies outside an expected range, the pre-defined interface may not adequately relay such data to an operator.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

A user interface generation system is described herein, wherein such system is employable within an industrial automation environment. The system relies upon an ability of programmable logic controllers or proxy to receive, process, and output data objects that are in accordance with a hierarchically structured data model. For example, the hierarchically structured data model can be designed based at least in part upon ISA S88, ISA S95, OMAC, and/or a combination thereof. It is understood, however, that any suitable hierarchical structure can be employed in connection with objects received, processed, and output by programmable logic controllers. Upon creation of such an object, a user interface generation system can access the object and utilize parameters associated with the object to dynamically generate a graphical user interface. For example, the object can include data that indicates that the object is associated with a particular process or device. Moreover, the object can indicate state of a process or device, and such state can be employed when generating the graphical user interface. Accordingly, much more robust user interfaces can be created when compared with conventional user interface generation systems.

Furthermore, objects can be received in sequence, thus enabling a graphical user interface to dynamically change with change in conditions. For example, a first object can indicate that a process is at a first state, and a second (later created) object can indicate that the process is at a second state. The user interface generation system can provide this alteration to a user upon receiving the objects. Furthermore, objects from a plurality of programmable logic controllers can be aggregated, and the aggregation can be employed in connection with creating a graphical user interface. Aggregated data from a plurality of programmable logic controllers can provide a high-level overview of a system and/or process, and such overview can then be provided to a user by way of a graphical user interface. In another example, templates can be associated with disparate parameters of objects, and such templates can be utilized in connection with creating a graphical user interface. For example, an object received from a programmable logic controller can include data relating to a particular machine. A template that includes a graphical rendering of the machine can then be accessed upon analyzing the object, and such template can be utilized to provide a graphical user interface to the user.

Moreover, dynamic and robust user interfaces can be created even when data is received from legacy programmable logic controllers. For example, legacy controllers do not support the aforementioned hierarchically structured data model, but rather receive, process, and output data in a flat-file manner. Such file structure is not conducive to the dynamic and robust creation of graphical user interfaces described herein. Through use of a proxy component, however, data from legacy programmable logic controllers can be mapped so that it conforms to the hierarchically structured data model. This mapping can be accomplished, for instance, by way of user interfaces. In another example, legacy programmable logic controllers may communicate over a disparate network when compared to a display device. Thus, a bridging component can be provided to recognize and re-package data according to a network over which data is communicated.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION

Figure 1:
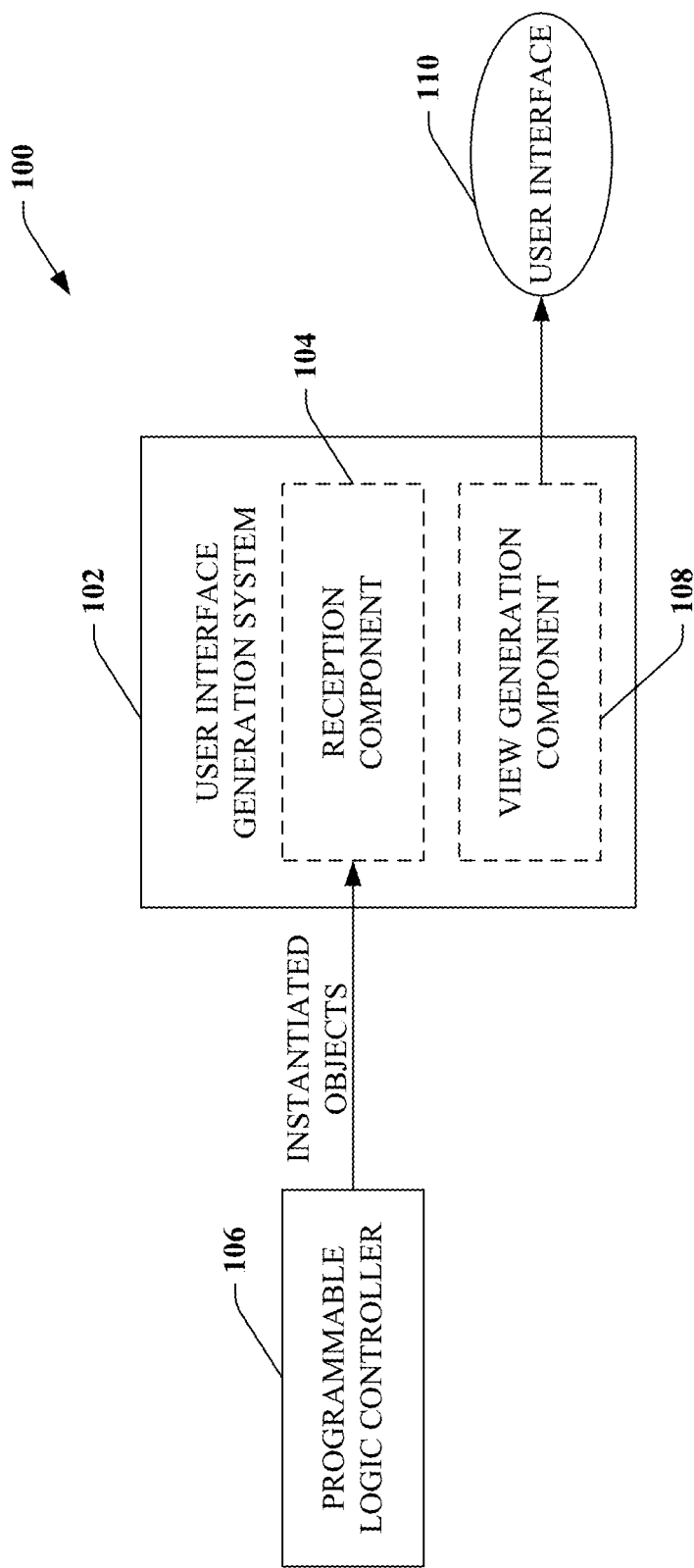
FIG. 1 is a high-level system block diagram of a system that facilitates dynamic generation of user interfaces in an industrial automation environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Turning now to the drawings, FIG. 1 illustrates a system 100 that can be employed in connection with building and providing a graphical user interface to an operator/user in an industrial environment. The system 100 includes a user interface generation system 102 that in turn comprises a reception component 104 that facilitates reception of instantiated objects from a programmable logic controller 106. For example, the instantiated objects can conform to a hierarchically structured data model (rather than a flat data model). In more detail, the programmable logic controller 106 can include at least a portion of a schema that enables such programmable logic controller 106 to recognize and output data that is structured in accordance with the hierarchically structured data model. The programmable logic controller 106 can interact with other controllers as well as higher-level systems, such as an Enterprise Resource Planning (ERP) system. ERP systems typically handle manufacturing, logistics, distribution, inventory, shipping, invoicing, and accounting for a company. The schema referenced above can also be employed by an ERP system associated with the programmable logic controller 106, thereby enabling seamless communication between the programmable logic controller 106 and the ERP system. Conventional systems, in contrast, often require ad-hoc programming to map between low-level logic utilized in controllers with more advanced object-oriented programming languages often employed within ERP systems. Another common use would be to interact with a Supply Chain Management system (SCM).

The hierarchically structured data model can be designed in such a manner to enable data objects to correspond to a hierarchical arrangement of a system and/or a hierarchical arrangement of processes that occur within the plant. Furthermore, the hierarchically structured data model can be designed in a manner that enables modeling of a plant across system and/or process boundaries. For instance, today's manufacturing facilities include batch processing, continuous processing, discrete processing, as well as inventory processing. Communication of meaningful data between these systems and processes is extremely difficult, as they are often designed and operated without regard for an adjacent process. The hierarchically structured data model can be implemented so that a substantially similar structure is provided with respect to a batch process, a continuous process, a discrete process, and inventory tracking. In one particular example, the hierarchically structured data model can be modeled in accordance with ISA S95, ISA S88, OMAC, and/or a combination thereof.

Thus, the controller 106 can generate instantiated objects that are received by the reception component 104. The objects can relate to low-level drives, motors, and the like, or more complex systems and/or processes, such as pumps, conveyors, etc. Furthermore, the objects can be representative of a state of a device and/or process. In other words, the programmable logic controller 106 can be utilized to undertake state-based control, and objects generated by the programmable logic controller 106 can be representative of particular states. A view generation component 108 that is communicatively coupled to the reception component 104 can then receive at least a subset of the instantiated objects, and thereafter dynamically create a user interface 110 based upon the received objects. For example, the object can include data indicating a process and/or a part thereof related to the object as well as a state associated with the process. The view generation component 108 can analyze the object and generate a display that is customized for such object. For instance, the user interface 110 can include a graphical depiction of a motor as well as a state of a motor. Conventionally, a user interface shell is created and data retrieved from the programmable logic controller 106 is displayed within the shell, regardless of state of a process, without graphical depictions, etc. The view generation component 108 enables creation of more robust user interfaces.

Furthermore, as described above, the hierarchically structured data model can be designed in accordance with a plant hierarchy. Thus any portion of the plant hierarchy can be utilized to dynamically generate views. For example, a "control module" object can be a child of an "equipment module" object, and the "equipment module" object can be a child of a "phase" object. Therefore, a process phase represented by a "phase" object can be utilized in connection with analyzing children of the object, and the view generation component 108 can dynamically create the user interface 110. Moreover, the view generation component 108 can receive a plurality of objects in sequence, thereby enabling the user interface 110 to be created in such a way to dynamically illustrate alteration in a system/process. The user interface 110 can be displayed upon any suitable display, such as a LCD display, a CRT display, a plasma display, or any other suitable display. Thus, it can be discerned that data received directly from a controller can be employed in connection with dynamically generating the user interface 110. In still another example, the view generation component 108 can consider context associated with a user/entity in connection with dynamically generating the user interface 110. For instance, the view generation component 108 can determine a user's role, current usage scenario, etc. The view generation component 108 can then generate the user interface 110 based upon such context. Thus, the view generation component 108 can cause wiring semantics for maintenance user's to be automatically generated, for example, if the context dictates such generation.

Figure 2:
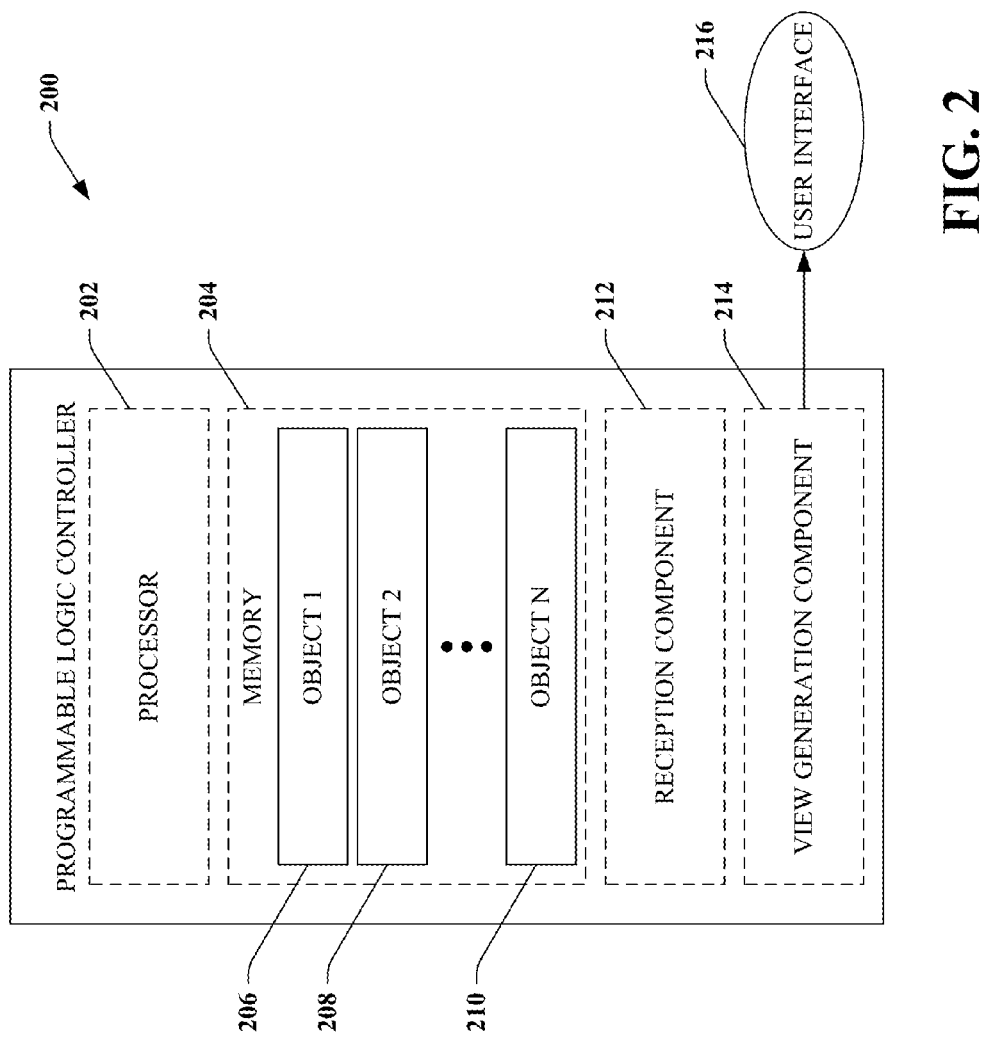
FIG. 2 illustrates a programmable logic controller that includes hardware/software that can be employed to generate graphical user interfaces in an industrial automation environment.

Referring now to FIG. 2, a programmable logic controller 200 with user interface generation capabilities is illustrated. The programmable logic controller can include a processor 202 for processing received data and control logic associated with the received data. In particular, the programmable logic controller 200 can include several input ports and receive data from sensors by way of such ports. This received data can then be processed by the processor 202 together with control logic that may be retained in memory 204. Moreover, the processor 202 can create objects 206-210 that represent a state of a piece of equipment, a grouping of pieces of equipment, a portion of a phase, an entire phase, and the like. These objects 206-210 can also at least temporarily be retained within memory 204, a hard disk (not shown) within the programmable logic controller 200, or other associated storage. Furthermore, the objects 206-210 can be provided to requesting entities networked with the programmable logic controller 200.

The programmable logic controller 200 can further include a reception component 212 that receives the objects 206-210 from memory 204 (or from an associated hard disk). A view generation component 214 is communicatively coupled to the reception component 212, and generates a user interface 216 based upon content of the objects 206-210. Thus, the programmable logic controller 200 itself can be utilized to generate the graphical user interface 216 (e.g., a display unit can be simply coupled to a port of the programmable logic controller 200). As described above, the objects 206-210 can be created in accordance with a hierarchically structured data model, and can further represent a state of a device and/or process. Based upon the data structure and the state information, the view generation component 214 can dynamically generate the user interface 216. Moreover, the objects 206-210 can represent a sequence of states—thus, if the view generation component 214 receives such objects 206-210 as they are created, the user interface 216 can represent a current state of a device/process and illustrate alterations of state as such alterations occur.

Figure 3:
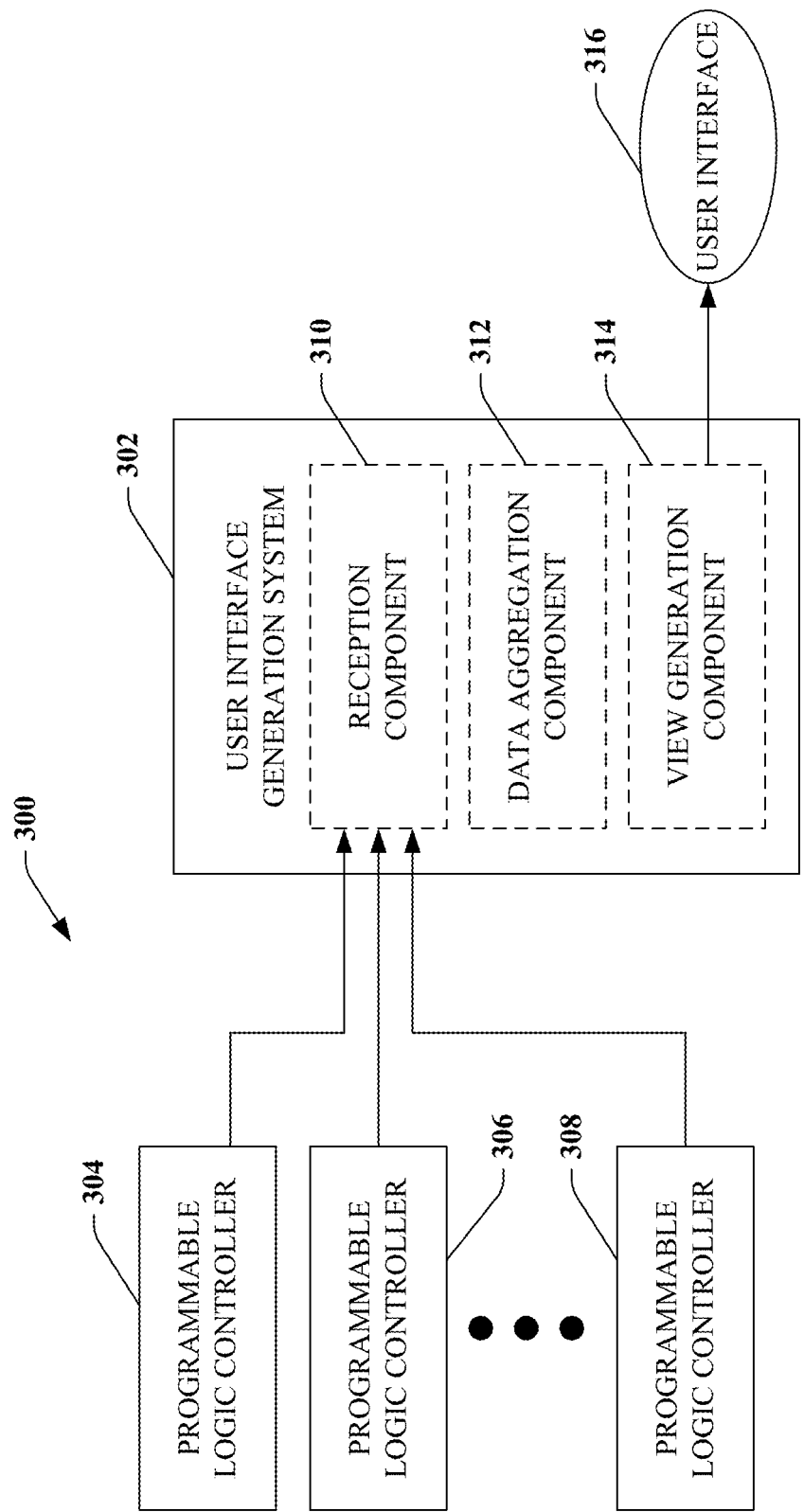
FIG. 3 illustrates a system that facilitates generation of graphical user interfaces based upon objects received from a plurality of programmable logic controllers.

Now turning to FIG. 3, a system 300 that facilitates automatic user interface generation within an industrial automation environment is illustrated. The system 300 includes a user interface generation system 302 that receives instantiated objects from a plurality of programmable logic controllers 304-308. The programmable logic controllers 304-308 can be designed to enable receipt, processing, and creation of objects that are in accordance with a hierarchically structured data model. The programmable logic controllers 304-308 can also create objects that represent a state of a particular device and/or process. In one particular example, the programmable logic controllers 304-308 can be utilized collectively to control a process. The user interface generation system 302 includes a reception component 310 that facilitates receipt of objects from the plurality of programmable logic controllers 304-308. For example, the reception component 310 can include ports or other suitable hardware interfaces as well as software/circuitry that enables reception of objects. The reception component 310 is associated with a data aggregation component 312, which can aggregate and organize the received objects. For example, an aggregation of the objects can provide a high-level view of state of a process. The aggregated data can thereafter be provided to a view generation component 314 that dynamically creates a user interface 316 based upon the aggregated data. This is made possible through implementation of the hierarchical data model. In other words, given various states of several devices/processes, a high-level view of an overlying process can be created by the view generation component 314 and provided to an operator. Moreover, the view generation component 314 can dynamically update the user interface 316 as objects are received from the programmable logic controllers 304-308.

Figure 4:
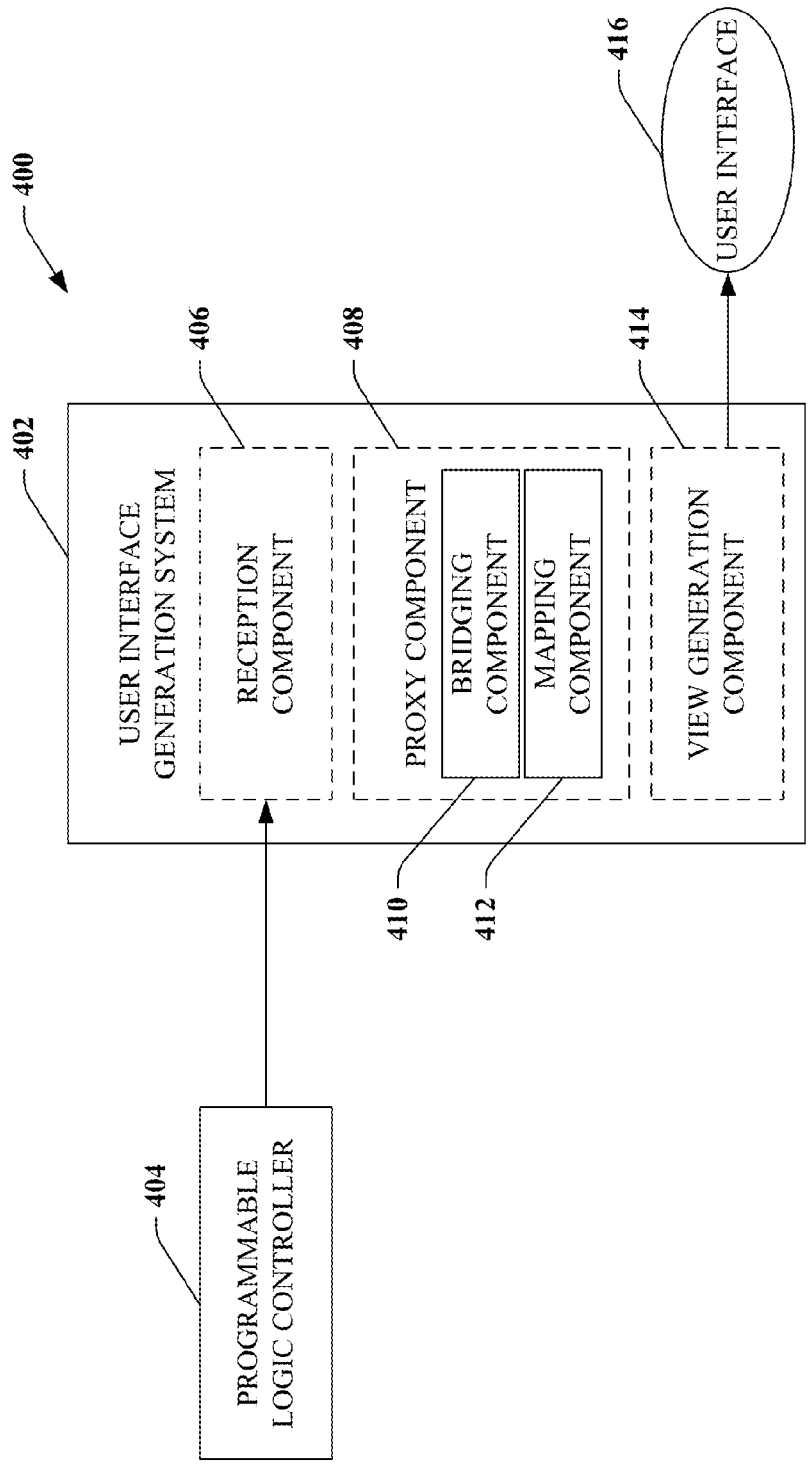
FIG. 4 illustrates a graphical user interface generation system that utilizes data from legacy/third party programmable logic controllers in connection with generating graphical user interfaces.

Referring now to FIG. 4, a system 400 that facilitates dynamic creation of customized graphical user interfaces in an industrial automation environment is illustrated. The system 400 includes a user interface generation system 402 that receives data from a programmable logic controller 404. The programmable logic controller 404 can be a legacy controller and/or a third party controller in that the programmable logic controller 404 does not support state-based control and/or a hierarchically structured data model. The user interface generation system 402 includes a reception component 406 that facilitates receipt of data from the programmable logic controller 404. The reception component 406 is associated with a proxy component 408 that can cause the data received from the programmable logic controller to be compatible with the hierarchically structured data model and/or state-based control.

In more detail, the proxy component 408 can include a bridging component 410 that operates as a bridge between disparate networks. For example, the programmable logic controller 404 may be adapted to send/receive data over a first network protocol, such as ProfiBus, FieldBus, Foundation FieldBus, Hart, or the like, while a display mechanism may be designed to send/receive data over a second network protocol, such as the Common Industrial Protocol (CIP). The bridging component 410 can recognize that data from the programmable logic controller 404 is packaged in accordance with the first network protocol and thereafter re-package such data so that it conforms to the second network protocol. The bridging component 410 can be associated with a mapping component 412 that can reformat the data so that it is in accordance with the hierarchically structured data model. For instance, the mapping component 412 can access templates associated with a data model associated with that employed by the programmable logic controller 404 and utilize such templates to map the data to the hierarchically structured data model. Resulting data, upon being manipulated by the proxy component 408, can then be provided to a view generation component 414. The view generation component 414 can then utilize such structured data to dynamically create a user interface 416. Thus, the view generation component 414 can be employed to generate customized, robust interfaces even when programmable logic controllers do not support the hierarchically structured data model.

Figure 5:
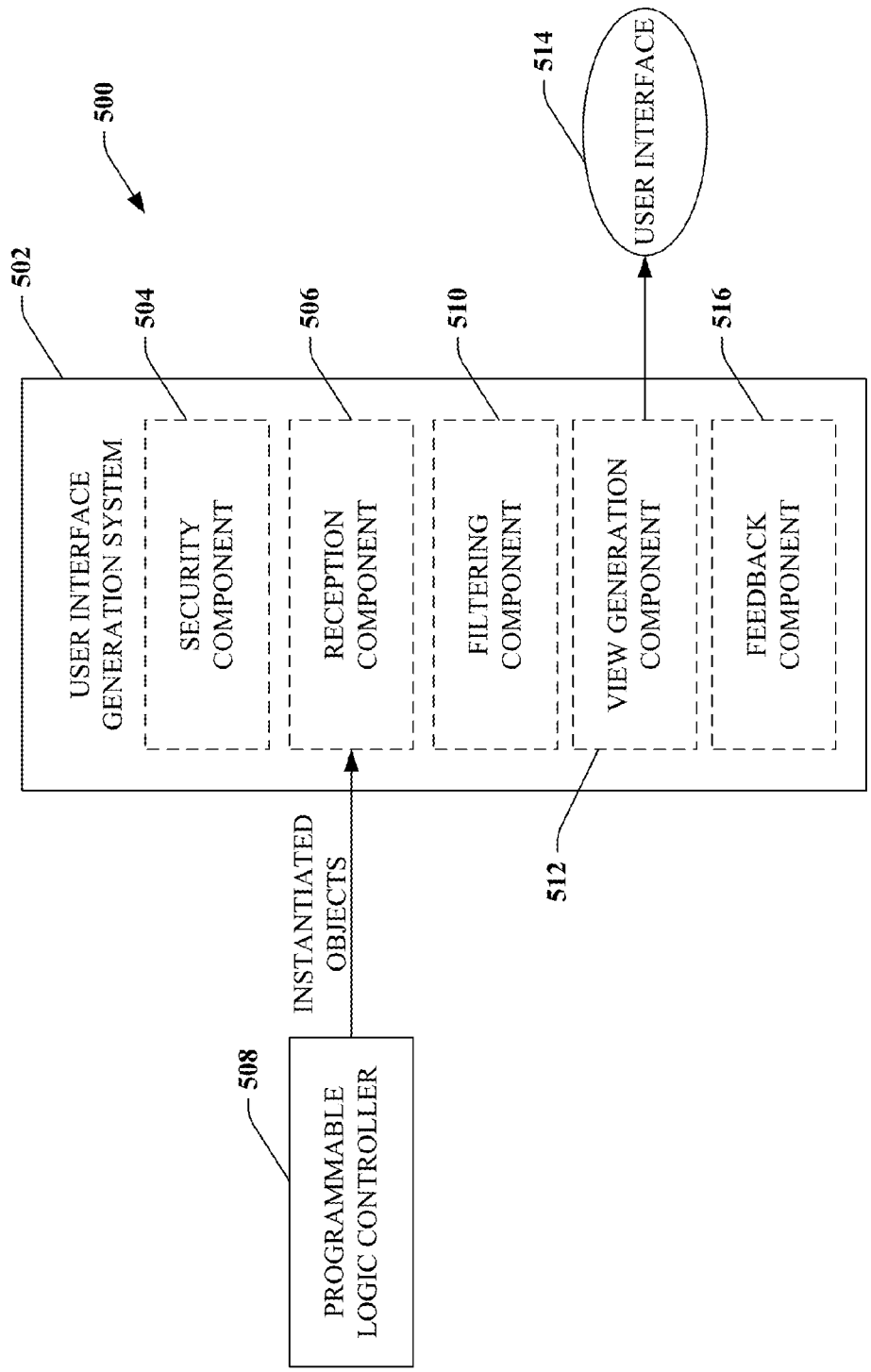
FIG. 5 illustrates a system that facilitates authorizing a user prior to providing such user with a graphical user interface.

Referring now to FIG. 5, a system 500 that facilitates dynamic generation of user interfaces based upon objects relating to a controller is illustrated. The system 500 includes a user interface generation system 502 that is employed to dynamically generate custom user interfaces. The user interface generation system 502 includes a security component 504 that ensures that a request for a user interface is from an authorized user. More particularly, the security component 504 can receive a request for a particular user interface from a user, and thereafter the security component 504 can request identification information from the user, such as a username, a password, a personal identification number, biometric indicia, and the like. The security component 504 can then determine validity of such data, and then determine an access level with respect to data requested by the user. For instance, a particular user may not have access to requested data, and the security component 504 can prohibit the user from reviewing such data by way of a user interface. In still another example, the security component 504 can ensure that the user interface generation system 502 is associated with sufficient physical resources to enable generation of a user interface. For instance, the security component 504 can determine that the user interface generation system 502 is not associated with a power source, and inform an operator of such lack of power. In another example, the security component 504 can determine that the user interface generation component 502 is associated with insufficient memory to support creation of an object. Still further, the security component 504 can consider an entity/user's context, such as entity/user's role (operator, technician, electrician, . . . ), an entity/user's scenario (routine maintenance, plant diagnostics, . . . ), and such context can be input to the security component 504 and employed to manage access to the user interface generation system 502. Further, the security component 504 can account for configuration of the user interface generation system 502 as well as connected devices.

If the security component 504 determines that a requesting user is authorized to review requested data, a reception component 506 can be employed to receive instantiated objects from a programmable logic controller 508. For example, the reception component 506 can first request particular data from the programmable logic controller 508, and thereafter receive results of such request. A filtering component 510 can then be employed to filter data based at least in part upon one of user identity and location. For instance, the user may be authorized for particular objects, but based upon location it is undesirable or unnecessary to display certain data to the user. Thus, the filtering component 510 can selectively filter such data.

Data (objects) that have not been filtered by the filtering component 510 can then be provided to a view generation component 512 that dynamically generates a user interface 514 based upon parameters associated with the objects. For instance, the objects can be state-based, and thus the view generation component 512 can generate a user interface 514 that displays a current state. As the view generation component 512 receives more objects, the user interface 514 can be updated. The user interface generation system 502 further includes a feedback component 516 that enables users to provide feedback with respect to the user interface 514. For instance, a user may wish to view a split screen, illustrating a first process in a first portion and a second process in a second portion. In another example, the user may wish to switch a system/process being viewed entirely. Moreover, the feedback component 516 can be utilized to alter/halt a process. For instance, through a keyboard, mouse, touch sensitive screen, pushbutton, or the like, the user can provide commands to the programmable logic controller 508 to alter/halt a particular device/process. The view generation component 512 can then provide an updated user interface upon such occurrence.

Figure 6:
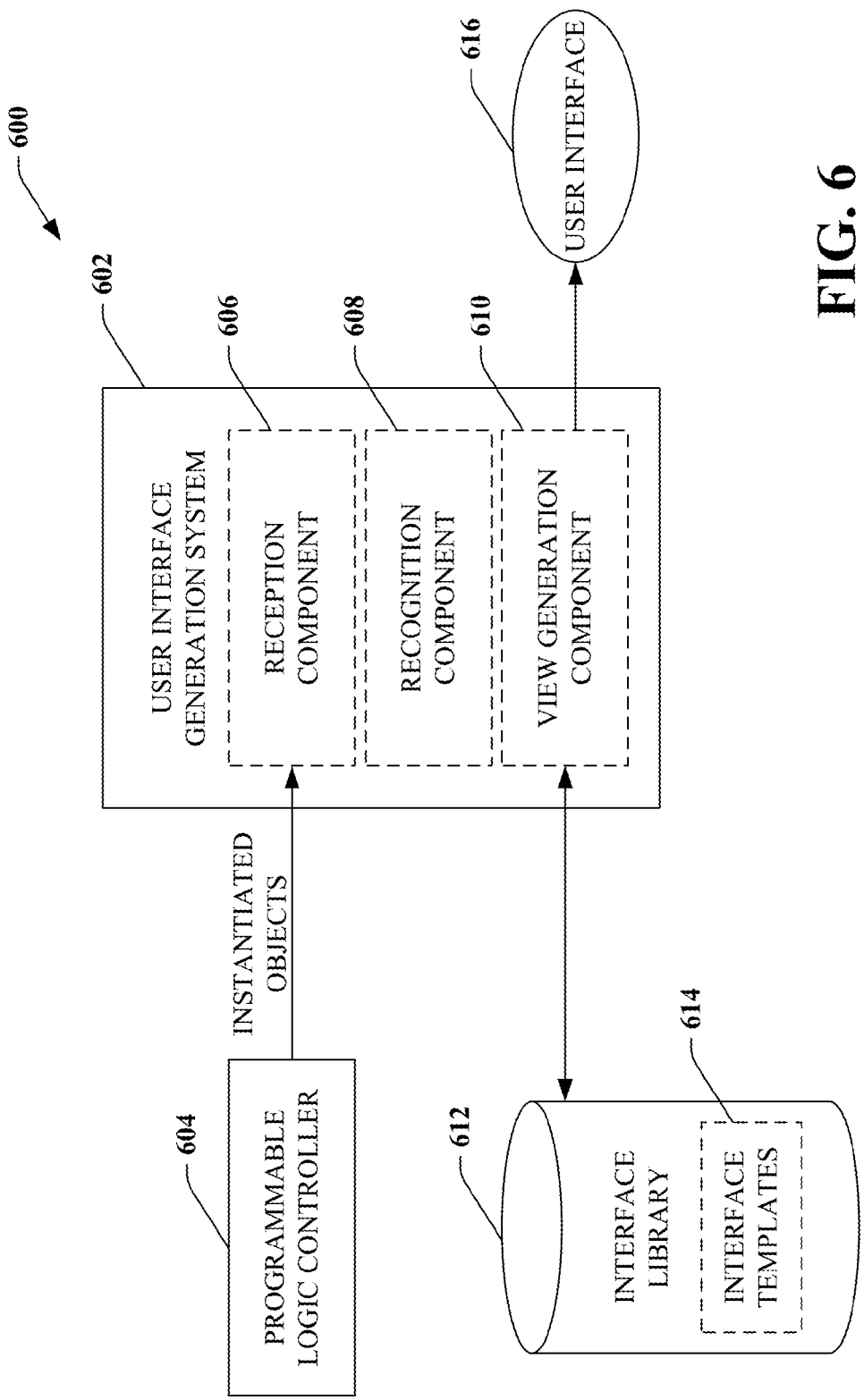
FIG. 6 illustrates a graphical user interface generation system that utilizes templates in connection with creating graphical user interfaces.

Turning now to FIG. 6, a system 600 that facilitates dynamic user interface generation in an industrial automation environment is illustrated. The system 600 includes a user interface generation system 602 that is communicatively coupled to a programmable logic controller 604. In more detail, the user interface generation system 602 includes a reception component 606 that facilitates receipt of instantiated objects from the programmable logic controller 604. The objects can conform to a hierarchically structured data model and be state-based objects. A recognition component 608 can recognize a state of a process and/or system based upon parameters of the objects, and relay such recognition to a view generation component 610. The view generation component 610 can then access an interface library 612 (which can be internal to and/or external from the user interface generation system 602). The interface library 612 can include a plurality of interface templates 614, and the view generation component 610 can select a template based upon the recognition made by the recognition component 608. For instance, the object can relate to a motor in a particular process, which can be discerned by analyzing such object. The template can include a graphical depiction of the motor. Thus, the view generation component 610 can create a user interface 616 that includes a graphical depiction of the motor as well as its current state. Any suitable template can be employed by the view generation component 610 in connection with generating the user interface 616.

Figure 7:
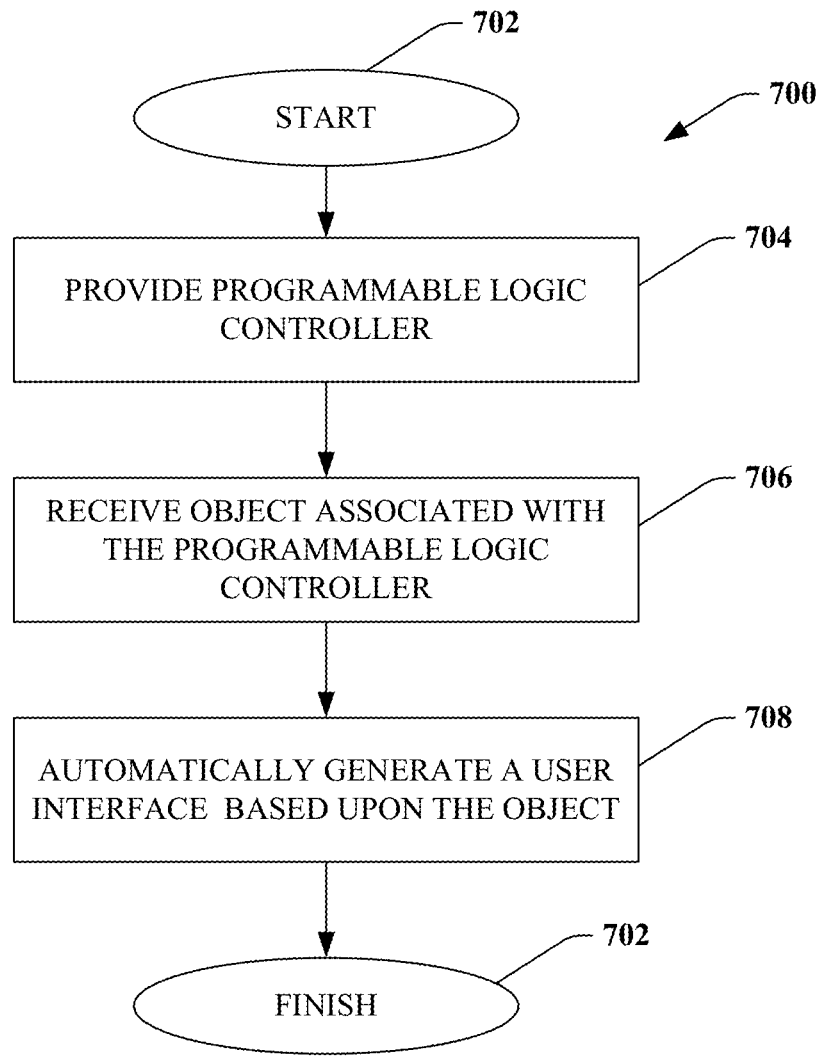
FIG. 7 is a representative flow diagram of a methodology for generating graphical user interfaces based upon objects received from a programmable logic controller.
Figure 8:
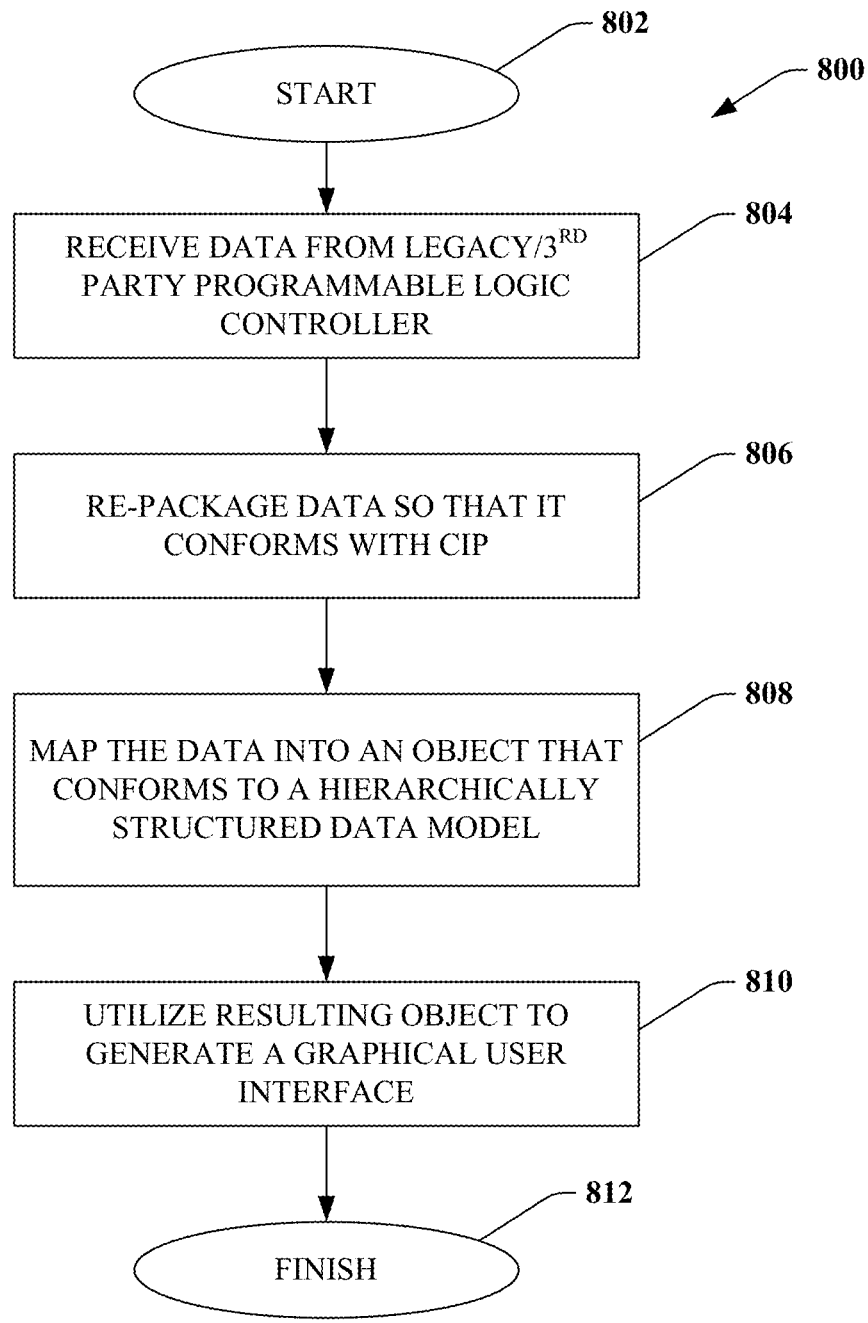
FIG. 8 is a representative flow diagram of a methodology for utilizing data from legacy programmable logic controllers to create a graphical user interface in an industrial automation environment
Figure 9:
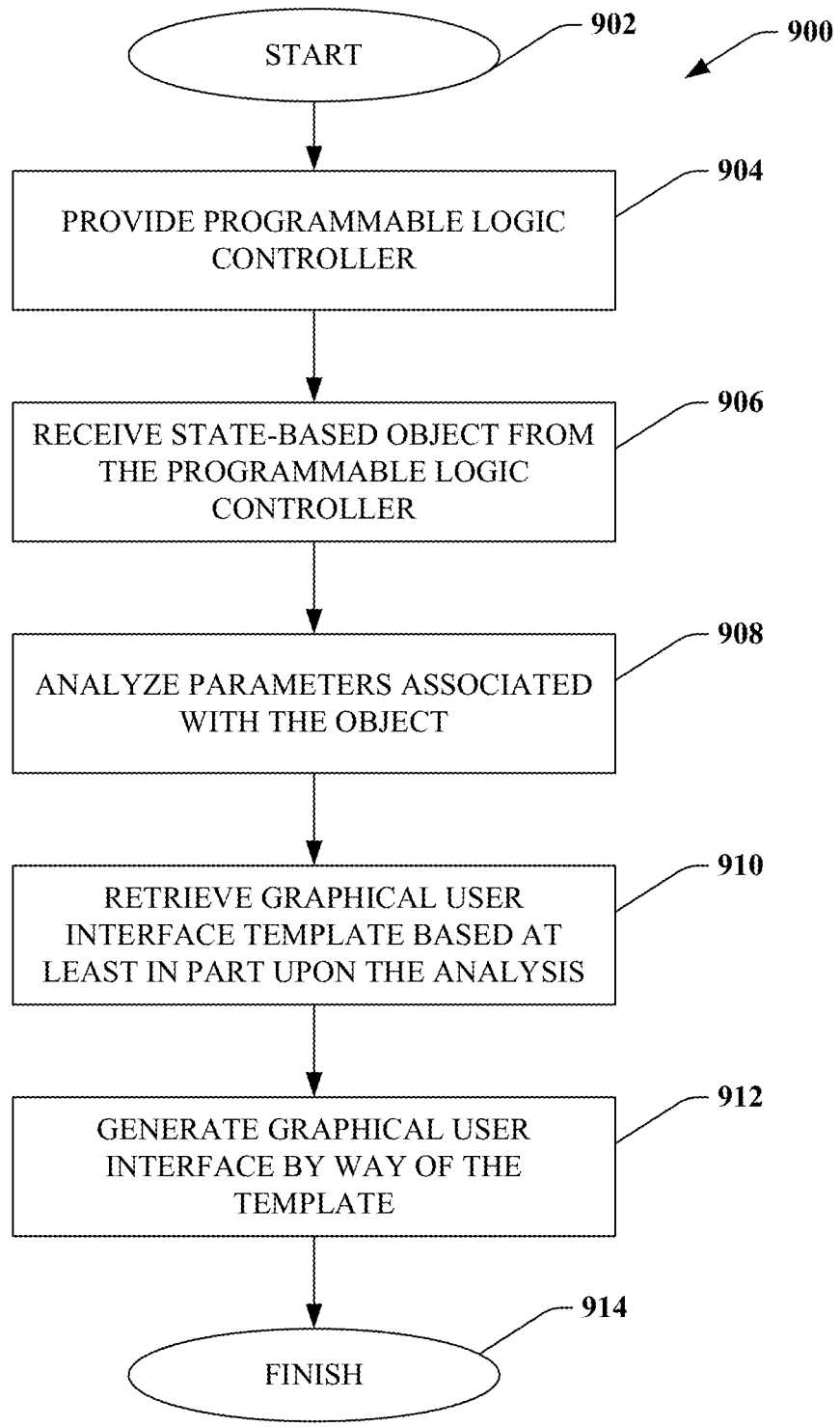
FIG. 9 is a representative flow diagram of a methodology for utilizing templates in connection with generating graphical user interfaces.

Referring to FIGS. 7-9, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning specifically to FIG. 7, a methodology 700 for dynamically generating user interfaces based upon data within a programmable logic controller is illustrated. The methodology 700 begins at 702, and at 704 a programmable logic controller is provided. The programmable logic controller can, for example, receive, process, and output data (objects) that conform to a hierarchical data model. Thus, review of structure of an object can reveal a significant amount of information, such as process being monitored, associated with the process, location in a factory of the process, etc. Furthermore, the programmable logic controller can receive, process, and output state-based data (objects). For example, an object can indicate state of a process as well as status of field sensors and actuators. At 704, an object associated with the programmable logic controller is received. For instance, the object can be created by the programmable logic controller in response to a state change, a status change of a sensor or actuator, or any other suitable triggering event. At 706, a graphical user interface is automatically generated based upon the received object. In one example, the object includes a parameter that is indicative of a machine being employed in a process, and a state associated with the machine. A user interface can be generated that illustrates the machine as well as the state of the machine. Thus, the structured data enables creation of a much more robust graphical user interface when compared with conventional systems/methods. The methodology 700 completes at 708.

Now turning to FIG. 8, a methodology 800 for dynamically generating user interfaces in an industrial automation environment is illustrated. The methodology 800 begins at 802, and at 804 data is received from a legacy and/or third party programmable logic controller. In other words, the programmable logic controller generates data conventionally (e.g., the programmable logic controller does not create data that conforms to a hierarchically structured data model). At 806, the data received from the programmable logic controller is re-packaged so that it conforms to the Common Industrial Protocol (CIP). Often, programmable logic controllers are configured to receive and send data over a protocol such as Hart, Foundation FieldBus, ProfiBus, or the like. However, a display mechanism may only be able to send/receive data over CIP. Thus, two disparate networks may need to be bridged, and such bridging can occur at 806. At 808, the data from the programmable logic controller is mapped so that it conforms to a hierarchically structured data model. In particular, the data received from the programmable logic controller may be associated with a flat namespace and may not support nesting. Through utilization of templates or other suitable means, the data received from the programmable logic controller can be mapped so that it conforms to the hierarchically structured data model. At 810, the resulting object, mapped to a hierarchically structured data model, is employed in connection with generating a graphical user interface, as described above. The methodology 800 completes at 812.

Referring now to FIG. 9, a methodology for utilizing templates in connection with generation of graphical user interfaces in an industrial automation environment is illustrated. The methodology 900 begins at 902, and at 904 a programmable logic controller is provided. At 906, a state-based object is received from the programmable logic controller. For example, the state can relate to state of a process, state of a device, status of a sensor, and/or the like. Furthermore, the object can be designed in accordance with a hierarchically structured data model. At 908, parameters associated with the object are analyzed. For instance, the object can be analyzed to determine a process associated with the object, a device or machine associated with the object, etc. At 910, a graphical user interface template can be retrieved based upon the analysis. For instance, if it is determined that the object is associated with a pump, a template relating to pumps can be received. At 912, a graphical user interface is generated by way of the template. The methodology 900 completes at 914.

Figure 10:
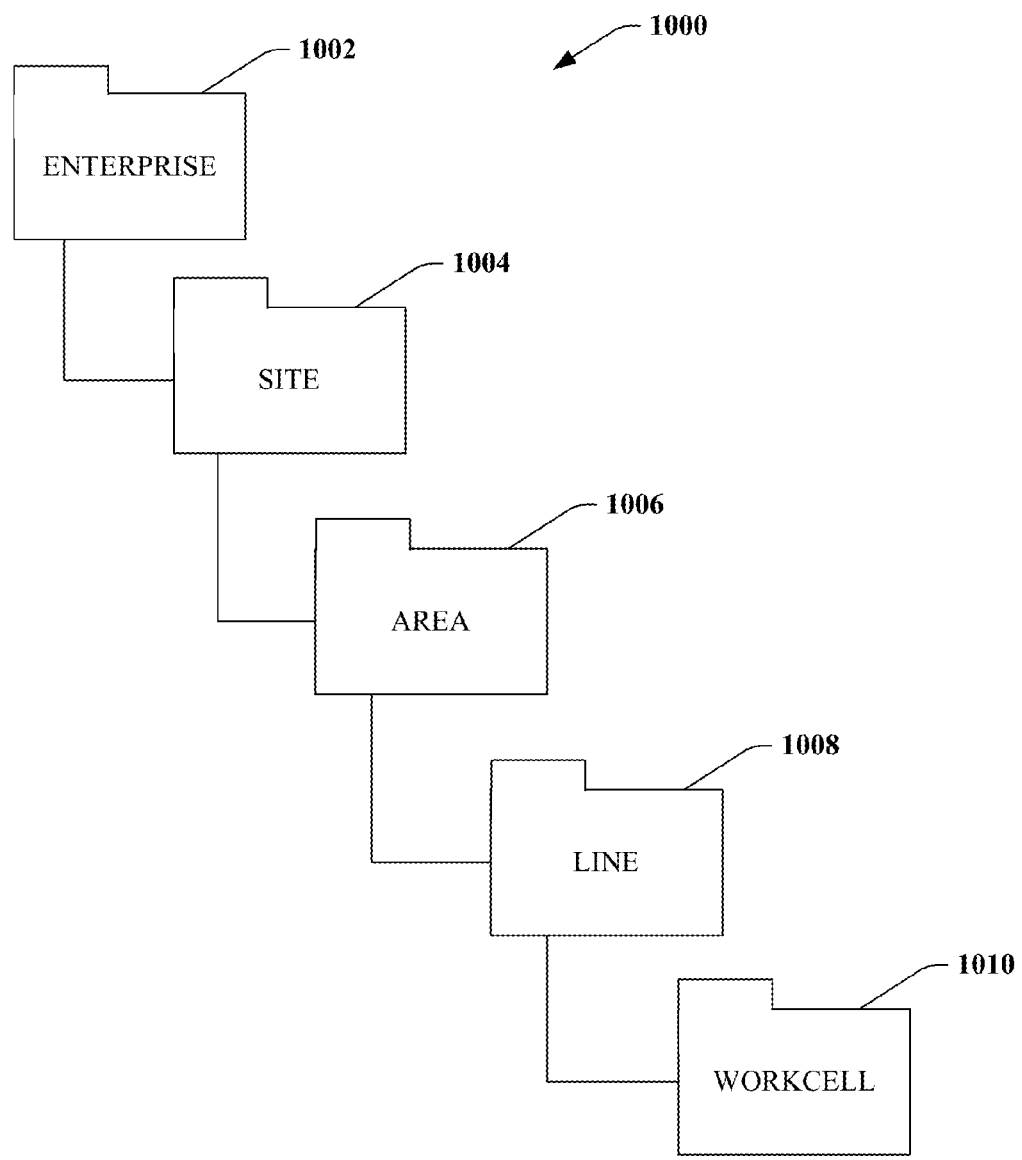
FIG. 10 is a visual representation of an exemplary structure upon which the hierarchically structured data model can be based.

Referring now to FIG. 10, an exemplary hierarchical structure 1000 which can be utilized in connection with the hierarchically structured data model described herein is illustrated. For example, the data model can facilitate nested structures, thereby mitigating deficiencies associated with data models that employ flat namespaces. The structure 1000 includes an enterprise level 1002, where a particular enterprise can be represented within data structured in accordance with a hierarchical data model. Beneath the enterprise level 1002 level can be a site level 1004, so that a particular factory (site) within an enterprise can be represented within a data packet. Beneath the site level 1004 an area level 1006 can exist, which specifies an area within the factory that relates to the data. A line level 1008 can lie beneath the area level 1006, wherein the line level 1008 is indicative of a line associated with particular data. Beneath the line level 1008 a workcell level 1010 can exist, thereby indicating a workcell associated with the data. Utilizing a nested, hierarchical data model, PLCs can become more aware of data associated therewith. Furthermore, the hierarchy 1000 can be customized by an owner of such hierarchy. For instance, more granular objects/levels can be defined within the hierarchy 1000.

Figure 11:
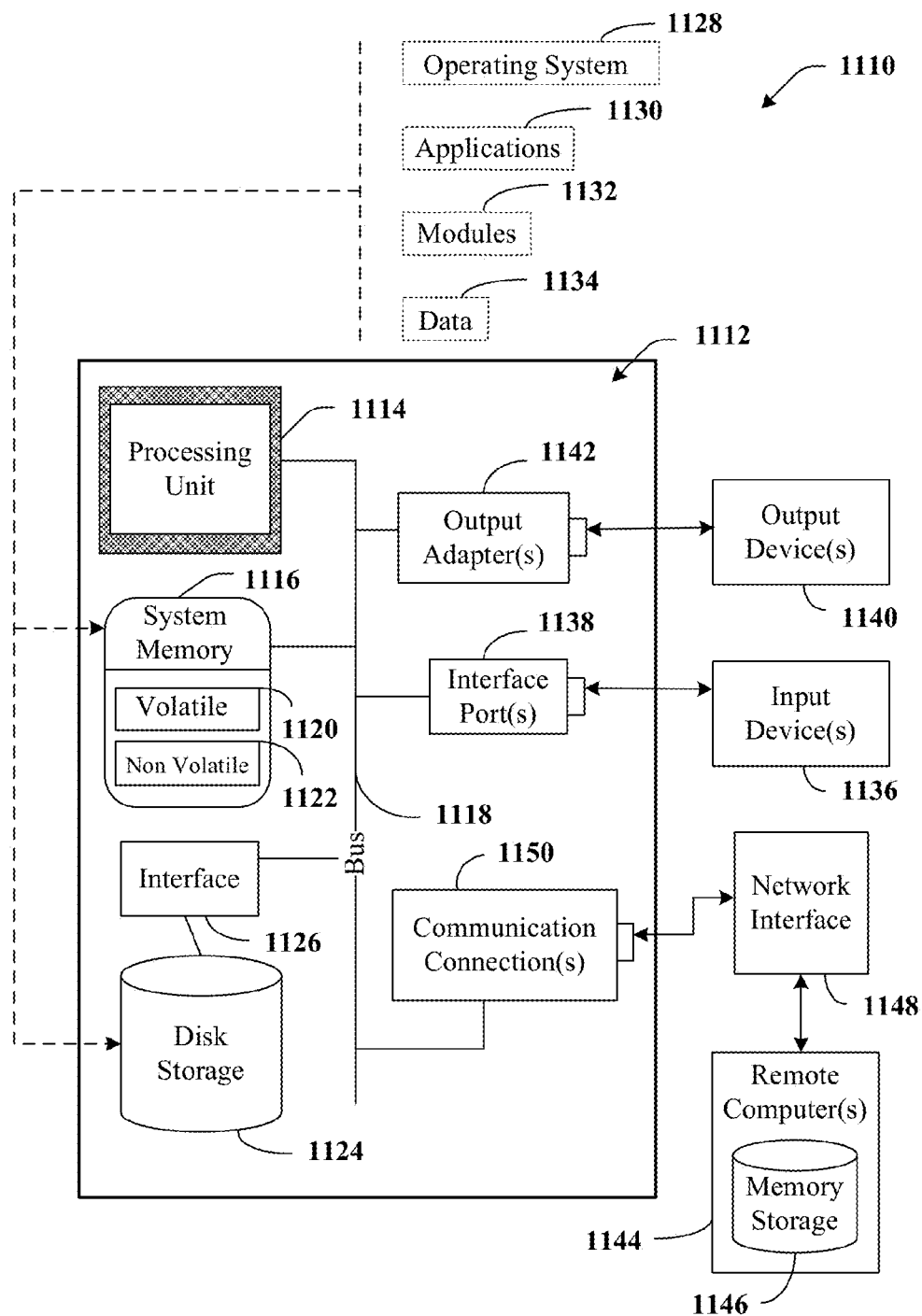
FIG. 11 is an example operating system upon which various features described herein can be implemented.

With reference to FIG. 11, an exemplary environment 1110 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the subject invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/ IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/ software necessary for connection to the network interface 1148 includes, for exemplary purposes only, internal and external technologies such as, modems including regular telephone grade modems, cable modems and DSL modems, ISDN adapters, and Ethernet cards.

Figure 12:
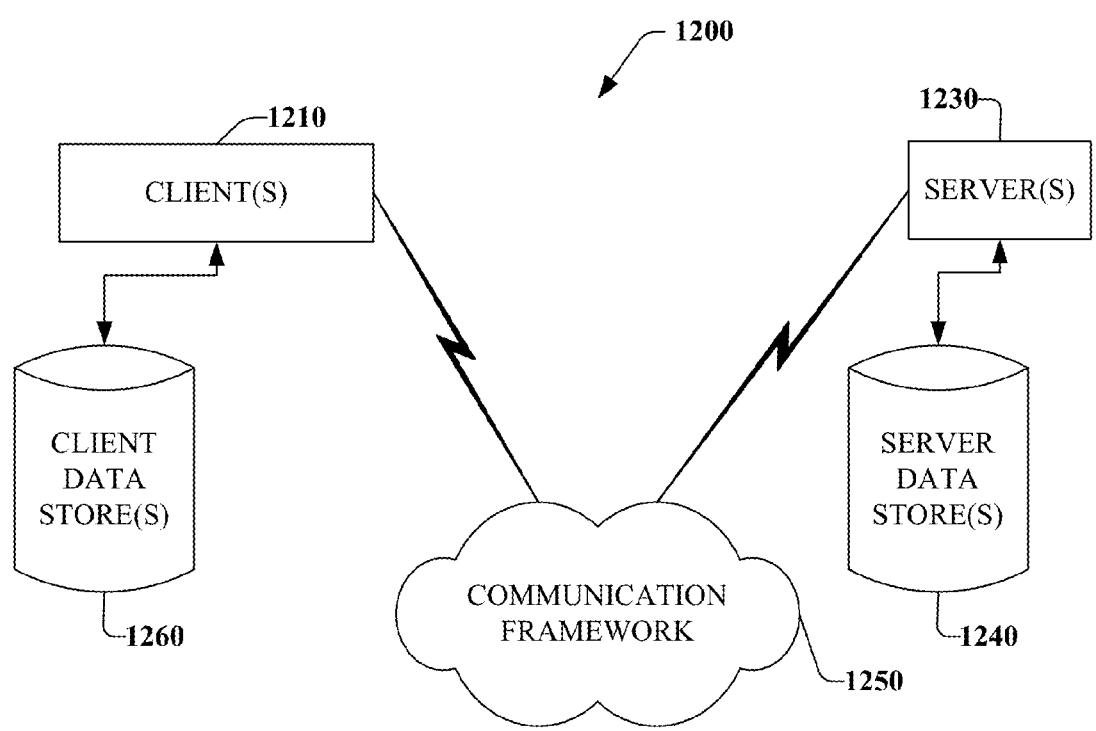
FIG. 12 is an exemplary computing environment within which various features described herein can interact.

FIG. 12 is a schematic block diagram of a sample-computing environment 1200 with which the subject invention can interact. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or software (e.g., threads, processes, computing devices). The servers 1230 can house threads to perform transformations by employing the subject invention, for example. One possible communication between a client 1210 and a server 1230 can be in the form of a data packet adapted to be transmitted between two or more computer processes. The system 1200 includes a communication framework 1250 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the servers 1230.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory communicatively coupled to the processor, the memory having stored therein computer-executable instructions, comprising:
   a reception component that receives an object that conforms to a hierarchically structured data model and comprises data indicating a state associated with at least one of an industrial process or an industrial device associated with the industrial process; and
   a view generation component that accesses an interface library and selects a template based at least in part upon the state associated with the at least one of industrial process or the industrial device, wherein the template comprises a graphical representation of at least one of the industrial process or the industrial device, and generates a display comprising at least the template and an indication of the state of the at least one of industrial process or the industrial device.

2. The system of claim 1, wherein the hierarchically structured data model is based at least in part upon one or more of ISA S95, ISA S88, or OMAC.

3. The system of claim 1, further comprising a data aggregation component that aggregates at least two objects, the view generation component generates the display based upon the aggregated data.

4. The system of claim 1, further comprising a proxy component that converts the object formatted in accordance with a first network protocol to correspond to the hierarchically structured data model.

5. The system of claim 1, further comprising a security component that receives a request for the display from an initiator, requests identification information from the initiator, and determines whether the initiator is authorized to review data displayed on the display based at least in part upon the identification information.

6. The system of claim 5, further comprising a filtering component that filters the data based at least in part upon identity of the initiator.

7. The system of claim 5, further comprising a feedback component that alters at least one of content or perspective of the display based upon feedback from the initiator.

8. A programmable logic controller, comprising:
a processor; and
a memory communicatively coupled to the processor, the memory having stored therein computer-executable instructions, comprising:
a reception component that receives an object that conforms to a hierarchically structured data model and comprises data indicating a state associated with at least one of an industrial process or an industrial device associated with the industrial process; and
a view generation component that accesses an interface library and selects a template based at least in part upon the state associated with the at least one of industrial process or the industrial device, wherein the template comprises a graphical representation of at least one of the industrial process or the industrial device, and generates a display comprising at least the template and an indication of the state of the at least one of industrial process or the industrial device.

9. The programmable logic controller of claim 8, wherein the hierarchically structured data model is based at least in part upon one or more of ISA S95, ISA S88, or OMAC.

10. The programmable logic controller of claim 8, further comprising a data aggregation component that aggregates at least two objects, the view generation component generates the display based upon the aggregated data.

11. The programmable logic controller of claim 8, further comprising a proxy component that converts the object formatted in accordance with a first network protocol to correspond to the hierarchically structured data model.

12. The programmable logic controller of claim 8, further comprising a security component that receives a request for the display from an initiator, requests identification information from the initiator, and determines whether the initiator is authorized to review data displayed on the display based at least in part upon the identification information.

13. The programmable logic controller of claim 12, further comprising a filtering component that filters the data based at least in part upon identity of the initiator.

14. The programmable logic controller of claim 12, further comprising a feedback component that alters at least one of content or perspective of the display based upon feedback from the initiator.

15. A display device, comprising:
a processor; and
a memory communicatively coupled to the processor, the memory having stored therein computer-executable instructions, comprising:
a reception component that receives an object that conforms to a hierarchically structured data model and comprises data indicating a state associated with at least one of an industrial process or an industrial device associated with the industrial process; and
a view generation component that accesses an interface library and selects a template based at least in part upon the state associated with the at least one of industrial process or the industrial device, wherein the template comprises a graphical representation of at least one of the industrial process or the industrial device, and generates a display comprising at least the template and an indication of the state of the at least one of industrial process or the industrial device.

16. The display device of claim 15, wherein the hierarchically structured data model is based at least in part upon one or more of ISA S95, ISA S88, or OMAC.

17. The display device of claim 15, further comprising a data aggregation component that aggregates at least two objects, the view generation component generates the display based upon the aggregated data.

18. The display device of claim 15, further comprising a proxy component that converts the object formatted in accordance with a first network protocol to correspond to the hierarchically structured data model.

19. The display device of claim 15, further comprising a security component that receives a request for the display from an initiator, requests identification information from the initiator, and determines whether the initiator is authorized to review data displayed on the display based at least in part upon the identification information.

20. The display device of claim 19, further comprising a filtering component that filters the data based at least in part upon identity of the initiator.

* * * * *